Sept. 28, 1965     B. C. PHILLIPS     3,208,739
CHARGE FORMING APPARATUS
Filed May 17, 1962     5 Sheets-Sheet 1
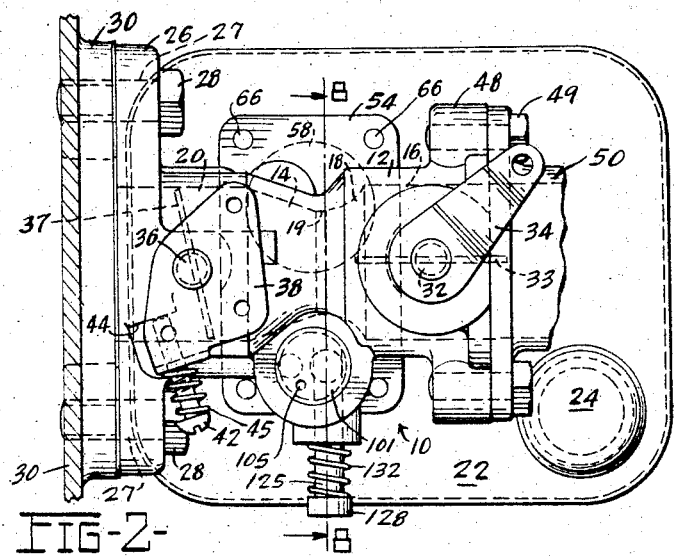
FIG-2-
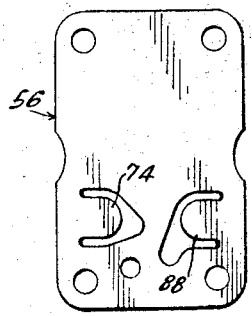
FIG-12-
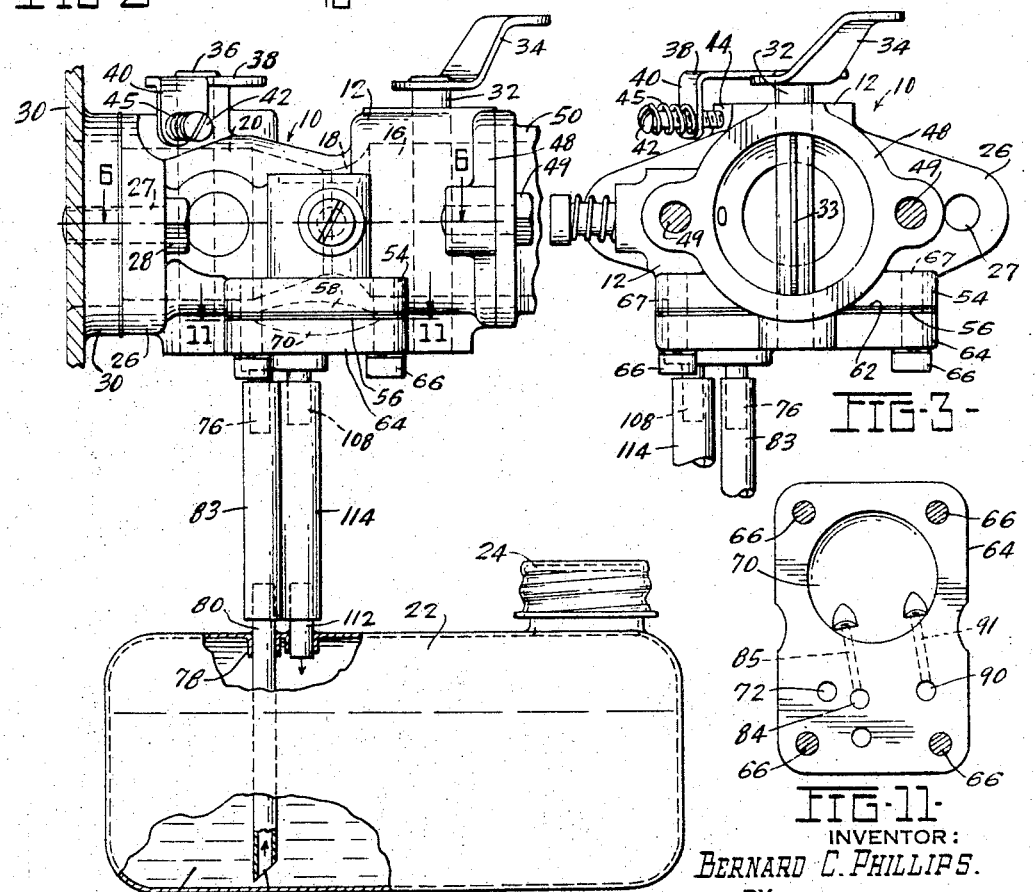
FIG-1-
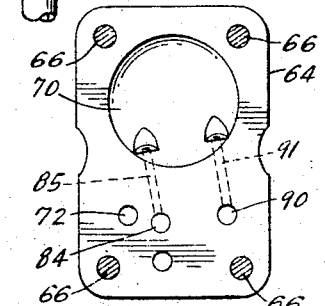
FIG-11-
INVENTOR:
BERNARD C. PHILLIPS.
BY
Harry B. Erneberger
ATTORNEY Sept. 28, 1965    B. C. PHILLIPS    3,208,739
CHARGE FORMING APPARATUS
Filed May 17, 1962    5 Sheets-Sheet 2
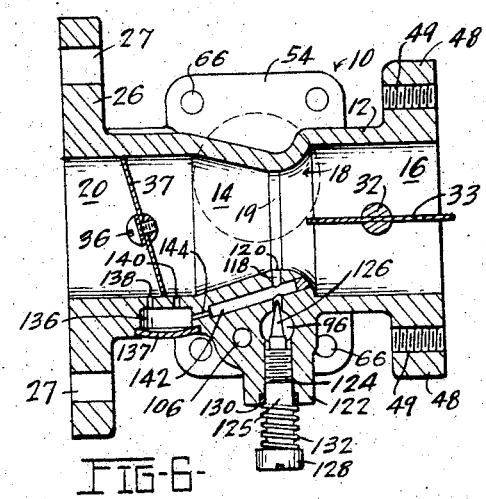
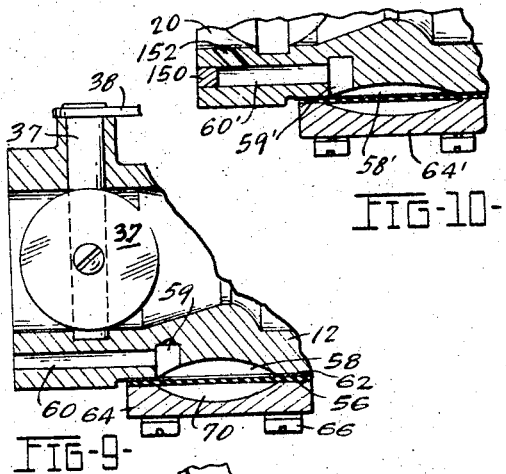
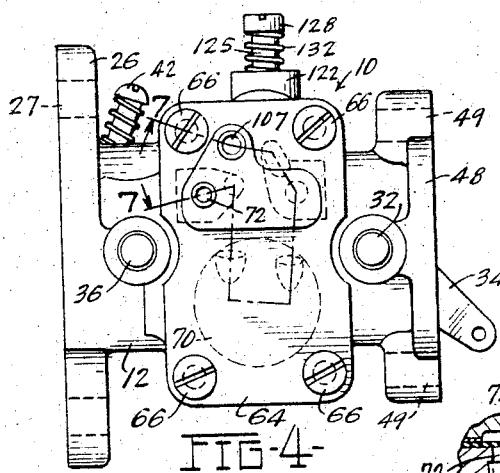
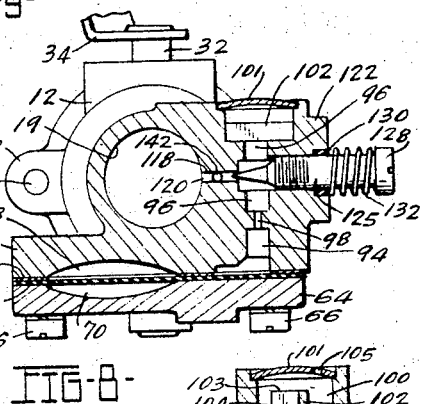
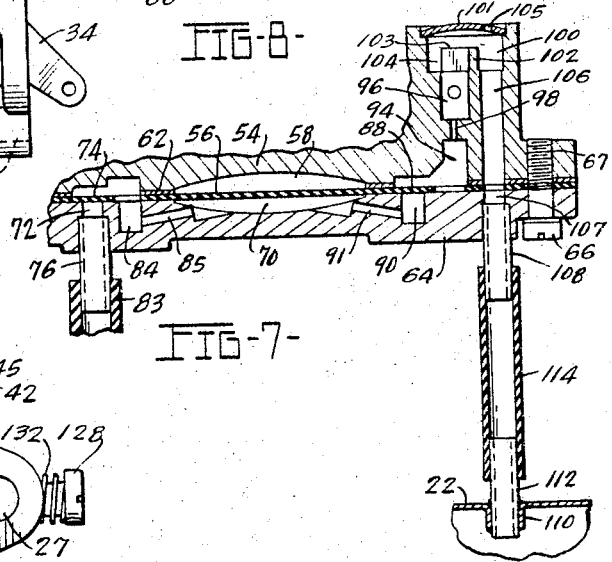
INVENTOR:
BERNARD C. PHILLIPS.
BY
Harry O. Ernsberger
ATTORNEY Sept. 28, 1965   B. C. PHILLIPS   3,208,739
CHARGE FORMING APPARATUS
Filed May 17, 1962   5 Sheets-Sheet 3
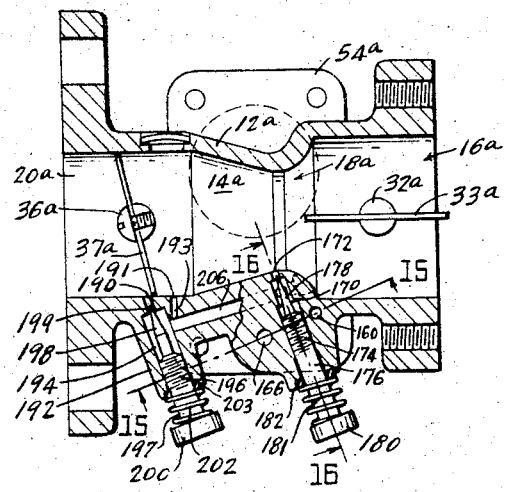
FIG-14-
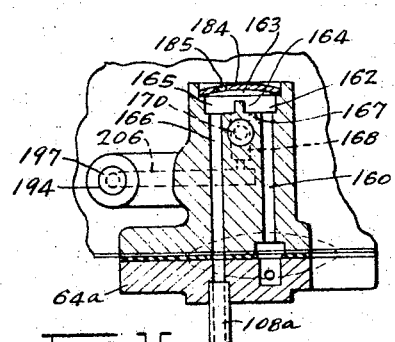
FIG-15-
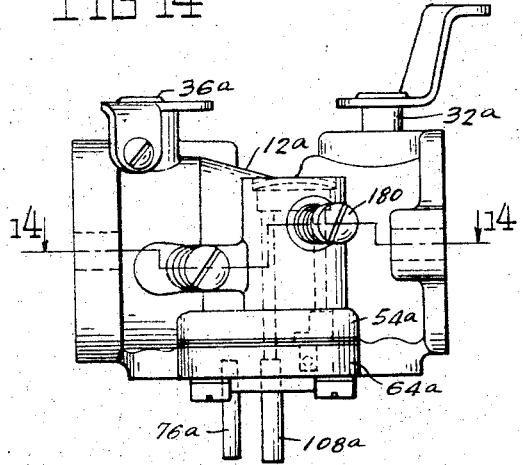
FIG-13-
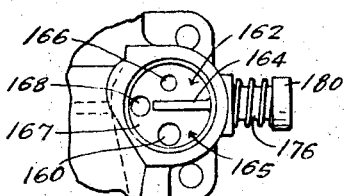
FIG-17-
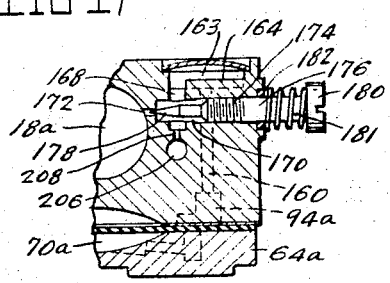
FIG-16-
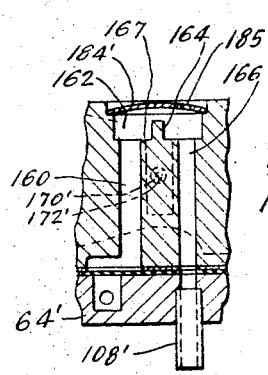
FIG-18-
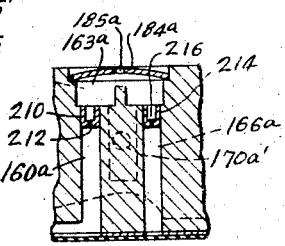
FIG-19-
INVENTOR:
BERNARD C. PHILLIPS.
BY
Harry C. Bruceberger
ATTORNEY

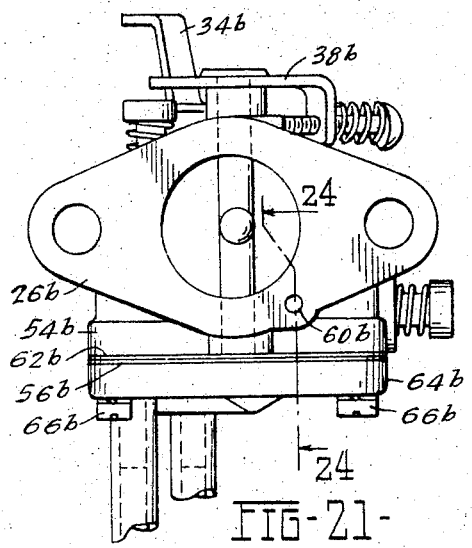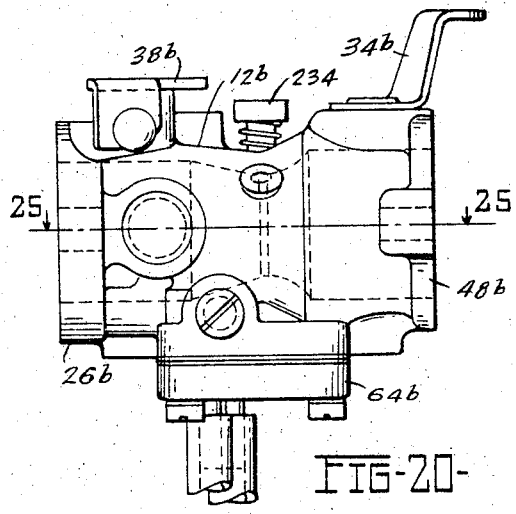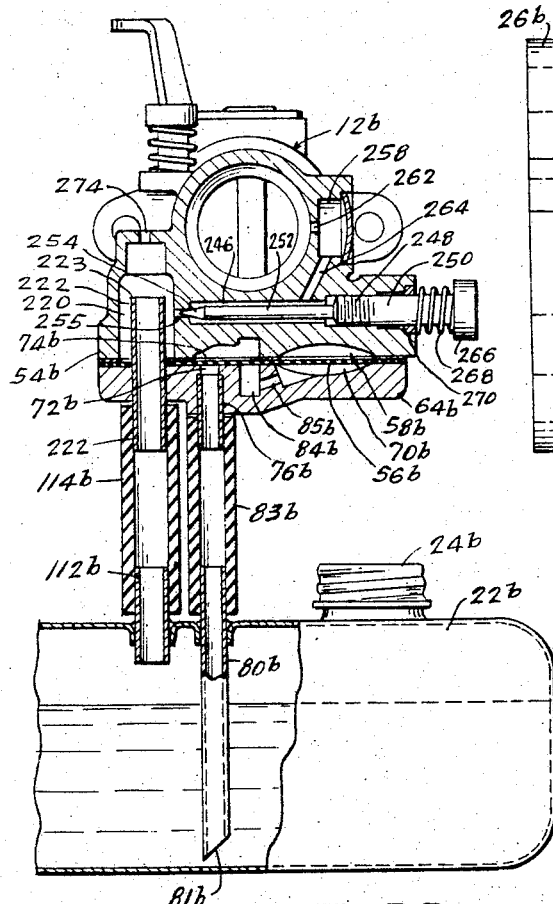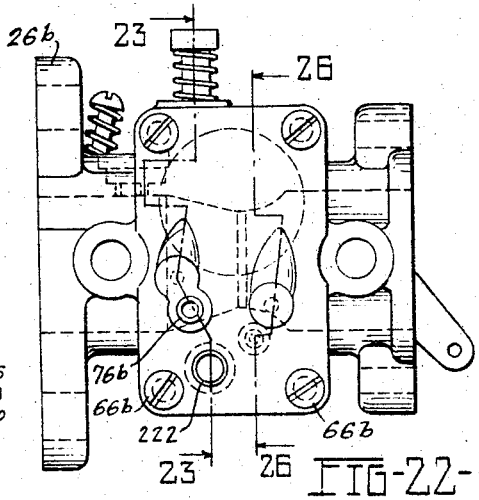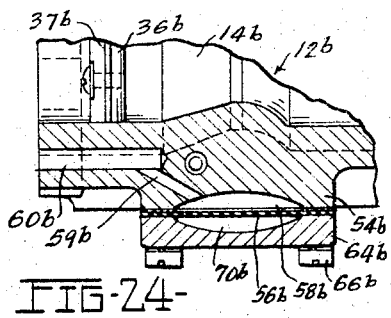

Sept. 28, 1965  B. C. PHILLIPS  3,208,739
CHARGE FORMING APPARATUS
Filed May 17, 1962  5 Sheets-Sheet 5
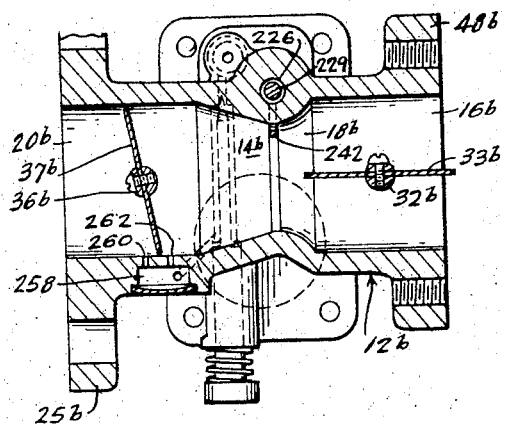
FIG-25-
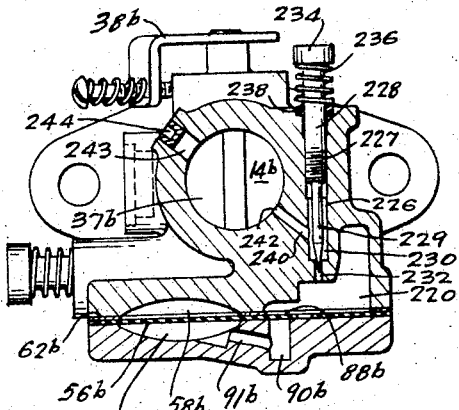
FIG-26-
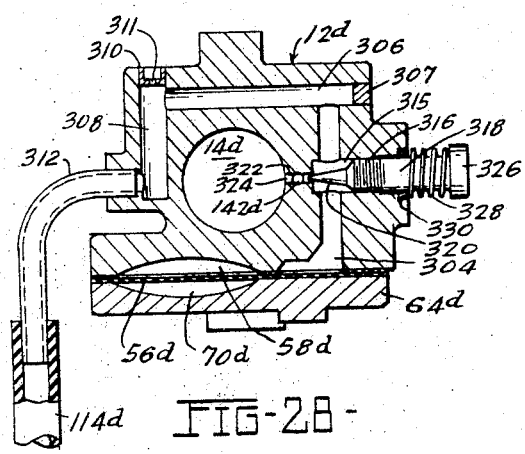
FIG-28-
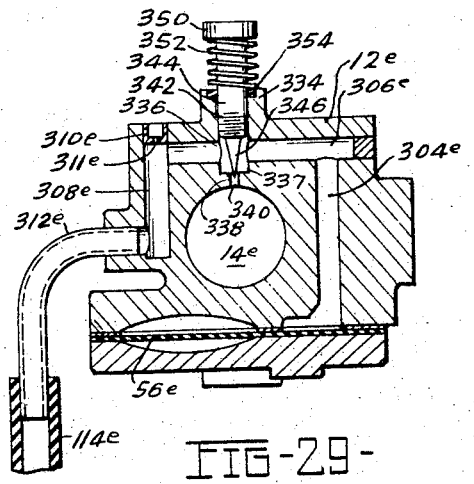
FIG-29-
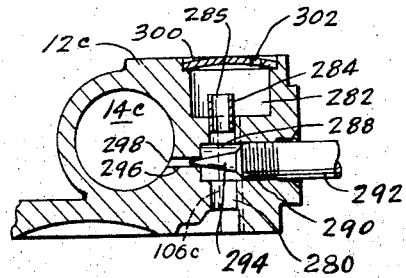
FIG-27-
INVENTOR:
BERNARD C. PHILLIPS.
BY
Harry O. Ernsberger
ATTORNEY

United States Patent Office
3,208,739
Patented Sept. 28, 1965

3,208,739
CHARGE FORMING APPARATUS
Bernard C. Phillips, Toledo, Ohio, assignor to The Tillotson Manufacturing Company, Toledo, Ohio, a corporation of Ohio
Filed May 17, 1962, Ser. No. 195,498
5 Claims. (Cl. 261—35)

This invention relates to charge forming apparatus or carburetor and more especially to a charge forming device or carburetor for use with internal combustion engines of either two cycle or four cycle types and which are not subjected to extreme angular positions during operation and wherein ample fuel delivery into a mixing passage is assured at all operating speeds of the engine.

It has been conventional practice in charge forming apparatus especially adaptable for use with two cycle engines such as those used for lawnmowers, outboard motors and the like to employ a metering diaphragm in the so-called aspirated type of diaphragm carburetor for actuating or controlling a fuel inlet valve in the carburetor dependent upon the amount of reduced pressure or aspiration developed in the mixing passage at various engine speeds. In such arrangements a gravity supply of fuel may be provided where it is convenient to position a fuel supply tank above the carburetor or, where the fuel must be elevated, a fuel pump is employed to effect flow of liquid fuel from a fuel supply tank to the carburetor.

A diaphragm type of aspirated carburetor or charge forming apparatus of this character in combination with a diaphragm fuel pump is illustrated in my Patent No. 2,796,838. Aspirated carburetors of the type employing a metering diaphragm have been extensively used particularly for chain saws where it is essential that the carburetor function in positions of extreme angularity or in inverted position. In such carburetors the control of fuel flow into the diaphragm chamber in the carburetor and the delivery of fuel into the air and fuel mixing passage are dependent upon the suction or reduced pressure developed in the mixing passage by air velocity moving therethrough under the influence of varying pressures in the crankcase of a two cycle engine. As the delivery of fuel from a carburetor fuel chamber into a mixing passage in carburetors of the above-mentioned type is dependent upon the suction or lift developed by the air flow through the mixing passage, difficulties have been encountered in providing adequate delivery of fuel at low engine speeds under load and for accelerating purposes and, where a secondary fuel delivery system is provided for idling and low speed engine operation, an anti-back bleed means is usually essential, associated with the main fuel discharge orifice or passage, to prevent back bleeding from the main nozzle through the secondary system when the latter is operating.

The present invention embraces the provision of a charge forming apparatus or carburetor wherein a substantially constant supply of fuel is automatically maintained in a region in the carburetor for delivery through the main orifice of the carburetor and for delivery through the secondary orifice system where a secondary orifice system is employed, whereby fuel delivery into the mixing passage is assured under all conditions of operation of the engine.

An object of the invention resides in the provision of a charge forming apparatus wherein a substantially constant flow or delivery of fuel to a region in the carburetor is maintained whereby fuel in said region is constantly available for delivery into the mixing passage without the use of aspiration or suction controlled metering means.

Another object of the invention resides in a carburetor embodying a fuel circulating means which is continuously operative during engine operation to set up fuel flow through a duct system wherein the delivery orifice means for the mixing passage is adjacent or below the level of fuel at a supply region in the duct system whereby delivery of fuel into the mixing passage through the orifice system is assured at all times and the excess fuel delivered by the fuel circulating means through the duct system is returned into the fuel tank in a manner whereby liability of flooding of the carburetor is eliminated.

Another object of the invention embraces a system for conveying fuel from a fuel supply tank to a carburetor wherein the system embodies a pumping means for maintaining fuel in a region adjacent an orifice means for delivery into a mixing passage wherein the region is at substantially atmospheric pressure and wherein excess fuel delivered by the pumping means to said region is returned to the fuel supply receptacle which is at atmospheric pressure.

Another object of the invention is the provision of a carburetor embodying a diaphragm fuel circulating or pumping means in which flap valve means are integrally formed on the diaphragm, the latter being vibrated or actuated by varying fluid pressure developed in a crankcase of a two cycle engine or varying fluid pressures in the intake or exhaust system of a four cycle engine.

Another object of the invention resides in a charge forming apparatus wherein the fuel delivery through an orifice system into the mixing passage is metered by an adjustable metering means and wherein the fuel adjacent the metering means is under a slight gravity head of fuel which facilitates delivery of fuel into the mixing passage under all operating conditions of the engine.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of one form of charge forming apparatus or carburetor of the invention illustrating a fuel supply tank disposed below the carburetor;

FIGURE 2 is a top plan view of the construction illustrated in FIGURE 1;

FIGURE 3 is a view of the air inlet end of the carburetor illustrated in FIGURE 1;

FIGURE 4 is a bottom plan view of the carburetor shown in FIGURE 1;

FIG. 5 is a view of the mixture outlet end of the carburetor shown in FIGURE 1;

FIGURE 6 is a longitudinal horizontal sectional view taken substantially on the line 6—6 of FIGURE 1;

FIGURE 7 is a sectional view taken substantially on the line 7—7 of FIGURE 4;

FIGURE 8 is a transverse sectional view taken substantially on the line 8—8 of FIGURE 2;

FIGURE 9 is a sectional view taken substantially on the line 9—9 of FIGURE 5 illustrating an arrangement of pulsing channels for the fuel circulating means;

FIGURE 10 is a fragmentary sectional view similar to a portion of FIGURE 9 illustrating a modified arrangement of pulsing channels;

FIGURE 11 is a horizontal sectional view taken substantially on the line 11—11 of FIGURE 1;

FIGURE 12 is a plan view of a pumping diaphragm of the fuel circulating system;

FIGURE 13 is a side elevational view of a carburetor similar to the form shown in FIGURE 1 embodying means for adjustably metering fuel flow through both main and secondary fuel delivery systems;

FIGURE 14 is a longitudinal horizontal sectional view taken substantially on the line 14—14 of FIGURE 13;

FIGURE 15 is a detail sectional view taken substantially on the line 15—15 of FIGURE 14;

FIGURE 16 is a detail sectional view taken substantially on the line 16—16 of FIGURE 14;

FIGURE 17 is a top plan view of the construction illustrated in FIGURE 16;

FIGURE 18 is a vertical sectional view illustrating an optional position for location of the main fuel delivery orifice;

FIGURE 19 is a modification of the arrangement shown in FIGURE 18;

FIGURE 20 is an elevational view of a modification of charge forming apparatus or carburetor of the invention;

FIGURE 21 is a view of the mixture outlet end of the carburetor illustrated in FIGURE 20;

FIGURE 22 is a bottom plan view of the arrangement shown in FIGURE 20;

FIGURE 23 is a vertical sectional view taken substantially on the line 23—23 of FIGURE 22 showing a fuel supply tank associated with the carburetor;

FIGURE 24 is a fragmentary sectional view taken substantially on the line 24—24 of FIGURE 21;

FIGURE 25 is a horizontal longitudinal sectional view taken substantially on the line 25—25 of FIGURE 20;

FIGURE 26 is a transverse sectional view taken substantially on the line 26—26 of FIGURE 22;

FIGURE 27 is a fragmentary sectional view illustrating a modification of fuel supply means for fuel delivery orifice means;

FIGURE 28 is a transverse sectional view illustrating a modification of fuel duct system of the carburetor, and FIGURE 29 is a sectional view similar to FIGURE 28 illustrating another modification of fuel duct system of the carburetor.

While the charge forming apparatus of the invention is particularly adaptable for use in supplying fuel and air mixture to a two cycle engine wherein the varying fluid pressure in the engine crankcase is employed as the pumping or pulsing force for the pumping diaphragm, it is to be understood that the carburetor or charge forming apparatus may be employed with four cycle engines and for such uses the fuel pumping arrangement may be connected with the intake or the exhaust manifold wherein varying fluid pressures therein may be utilized to actuate the pumping diaphragm.

With reference to the form of charge forming apparatus or carburetor illustrated in FIGURES 1 through 9, the carburetor or charge forming apparatus 10 is inclusive of a body or body member 12 formed with a fuel and air mixing passage 14 in communication with an air inlet portion or air horn 16, said mixing passage embodying a Venturi 18 having a restricted zone or choke band 19, the Venturi being in communication with a mixture outlet region 20. As illustrated in FIGURE 1, the carburetor is normally positioned above a fuel tank or receptacle 22 having a filler opening normally closed by a filler cap 24. The cap 24 does not require a vent opening as the fuel tank is vented through the carburetor as hereinafter explained.

The mixture outlet end 20 of the carburetor body 12 is fashioned with a mounting flange 26 formed with openings 27 arranged to receive and accommodate securing bolts 28 for attaching the mounting flange 26 to the crankcase 30 of a two cycle engine or to an intake manifold of a four cycle engine. Journaled in suitable bearings formed by bores in the air inlet end of the body 12 is a rotatable shaft 32 upon which is mounted a disc-type choke valve 33 for use in starting the engine with which the carburetor may be employed. The upper end of the shaft 32 is provided with a manipulating arm or member 34 for operating the choke valve 33.

Extending across the mixture outlet 20 and journaled in bores formed in the body 12 is a throttle shaft 36 provided with a disc-type throttle valve 37 for controlling the flow of fuel and air mixture into the engine.

The upper end of the shaft 36 extending above the carburetor body is provided with an arm or member 38 for manipulating the throttle valve. The member 38 is provided with a depending ear portion 40 having a threaded bore to accommodate a screw 42, the end of the screw being arranged to engage an abutment 44 defining the near closed or idle position of the throttle valve 37.

The screw 42 is adjustable to regulate the position of the throttle valve 37 in engine idling position. An expansive coil spring 45 is disposed between the head of the screw and the ear 40 to establish sufficient friction to retain the screw 42 in adjusted position. The air inlet end 16 of the carburetor body 12 is fashioned with a flange 48 provided with openings to receive bolts 49 for securing an air cleaner or air filter 50 to the carburetor.

The carburetor is inclusive of a duct system for delivering fuel into the mixing passage from a constant supply region or reservoir and a pulse operated diaphragm pump or fuel circulating arrangement for elevating fuel from a fuel tank to the constant supply region or reservoir and for returning excess fuel from the constant supply region to the fuel tank. Extending across the lower surface of a boss portion 54 formed integrally with the carburetor body 12 is a flexible pumping diaphragm 56 which may be fashioned of any suitable flexible impervious material such as a synthetic rubber of a type which is resistant to deleterious effects of hydrocarbon fuels.

The boss portion 54 is fashioned with a recess providing a pulsing or pumping chamber 58 which is connected with a source of varying fluid pressure such as the crankcase 30 of a two cycle engine. As shown in FIGURE 9, the chamber 58 is in communication with connecting ducts 59 and 60, the duct 60 extending through the mounting flange 26 and registers with an opening in the engine crankcase wall whereby the varying fluid pressures established by the reciprocating piston of the engine sets up pumping impulses in the pulsing or pumping chamber 58 to cause flexure in the diaphragm 56 and hence a vibration or pumping action of the diaphragm.

A gasket 62 is interposed between the diaphragm 56 and the boss 54 of the carburetor body 12. Disposed beneath the diaphragm 56 is a member or plate 64 which is of the general contour or shape of the boss 54 and is secured to the boss 54 by means of screws 66 extending through registering openings in the member 64, the diaphragm 56, and gasket 62, the screws 66 extending into threaded bores 67 formed in the boss portion 54, one of which is illustrated in FIGURE 7. Thus the screws serve to hold the plate or member 64, the diaphragm and the gasket in assembled relation with the carburetor body 12.

The pump construction is of the general character as disclosed and embraced in my Patent No. 2,796,838 wherein flap valves are integrally formed on the diaphragm for controlling fuel flow into and out of a fuel chamber.

The member 64 is formed with a circular recess forming a fuel chamber 70, shown in FIGURES 7, 8, 9 and 11. As particularly shown in FIGURE 7, a flap valve 74 formed on the diaphragm 56 is arranged to control an inlet port 72.

The port 72 is in communication with an inlet tube 76 pressed or snugly fitted into a bore formed in plate 64 in alignment with port 72 as shown in FIGURE 7. As shown in FIGURE 1, the fuel receptacle or tank 22 is formed with an opening defined by a downwardly extending circular flange 78 into which projects a tube 80 having its entrance 81 adjacent the bottom of the tank immersed in the fuel 82 contained in the tank. The tube 80 may be welded or otherwise securely fastened to the flange 78.

The inlet tube 76 and the tube 80 are connected together by a flexible tubular means or hose 83 fashioned of synthetic rubber, resinous plastic or other suitable material which is resistant to the effects of hydrocarbon fuels. The ends of the tube 83 are telescoped over the upper end of tube 80 projecting exteriorly of the fuel tank 22 and the inlet tube 76 as shown in FIGURES 1 and 7. The inlet port 72 is in communication with the fuel chamber 70 in the pumping means through interconnecting ducts 84 and 85, shown in FIGURES 7 and 11.

The diaphragm 56 is fashioned with a second flap valve 88 disposed adjacent an outlet port 90 which is in communication with the fuel chamber 70 by a duct 91.

The body 12 of the carburetor is fashioned with a passage 94 which is in communication with a second passage or duct 96 through a restricted duct or passage 98, as shown in FIGURE 7. Formed in the body 12 above the passage or duct 96 is a supplemental chamber 100, the upper end of which is closed by a Welsh plug 101. Extending across the chamber 100 is an abutment or ridge 102 which defines, with the adjacent wall region of the chamber 100, a reservoir or constant fuel supply region 104 in the body member 12. The plug 101 is fashioned with a vent opening 105 so that atmospheric pressure exists in the chamber 100, the vent also functioning to establish atmospheric pressure in the fuel tank through a fuel return system.

The fuel return system or means for returning excess fuel delivered into the chamber 100 by the fuel pumping or circulating means is inclusive of a duct or passage 106 in the body 12 which is in communication with a passage 107 formed in the member 64, the gasket 62 and the diaphragm 56 being formed with registering openings in alignment with the ducts 106 and 107. Pressed or snugly fitted into a bore formed in the member 64, in alignment with the passage or duct 107, is a tubular means or tube 108 as shown in FIGURE 7. The upper wall of the fuel tank 22 is formed with a second depending circular flange 110 into which is fitted a tube 112 welded or otherwise fixedly secured to the flange 110.

The tube 112 projects only a short distance into the fuel tank 22, as shown in FIGURE 1. Telescoped over the tubes 108 and 112 is a flexible hose or tube 114 fashioned of synthetic rubber, resinous plastic or other suitable material. The passages 106, 107, tubes 108, 112 and the flexible tube 114 form a return duct system for conveying excess fuel in the chamber 100 into the fuel tank 22.

During engine operation, the pumping diaphragm 56 pumps fuel from the tank 22 into the chamber 70, thence through the passages or ducts 91, 90, 94, 96 and 98 into the constant fuel supply region or reservoir 104 to a level determined by the height of the abutment or ridge 102. The pumping or fuel circulating means is of a capacity to continuously deliver liquid fuel into the reservoir 104 in excess of the maximum fuel requirements of the engine with which the carburetor may be used. The chamber 104 provides a constant supply or head of fuel for delivery through the fuel delivery system into the mixing passage 14.

The carburetor body is provided with a main fuel passage 118 the outlet of which forms a main nozzle or fuel delivery orifice 120, as shown in FIGURES 6 and 8, the orifice opening into the choke band or restricted region 19 of the Venturi 18. It should be noted that in the carburetor illustrated in FIGURES 1 through 9, the main orifice is horizontally arranged, that is, the axis of the main orifice is parallel to the plane of the pumping diaphragm 56.

The carburetor body 12 is fashioned with a boss 122 provided with a threaded bore to accommodate a threaded portion 124 of a manually adjustable valve member 125 fashioned with a conically-shaped or needle valve portion 126 which extends into the region of the passage 118 at its point of communication with the duct or passage 96. The valve body 125 is provided with a head portion 128. An annular sealing gasket 130 surrounds the valve portion to prevent leakage of liquid fuel along the valve member 125.

An expansive coil spring 132 is interposed between the head 128 and the annular sealing gasket 130 to hold the gasket in sealing relation with the valve member 125 and to set up friction to maintain the valve body 125 in adjusted position. By rotating the valve body 125 through its threaded connection in the bore in the boss 122, the needle valve portion 126 may be adjusted with respect to the passage 118 to meter or regulate the delivery of fuel through the main orifice 120 into the Venturi.

In the embodiment illustrated in FIGURES 1 through 9, the carburetor is provided with a secondary fuel delivery system for engine idling and low speed purposes. As shown in FIGURE 6, the body 12 is formed with an auxiliary chamber 136 having a bottom wall formed by a Welsh plug 137. The chamber 136 is in communication with the mixing passage through an engine idling orifice 138 and a low speed orifice 140. The chamber 136 is in communication with the main fuel passage 118 by a duct or passage 142 and a restriction 144.

Through this arrangement, fuel for delivery from the secondary orifices 138 and 140 is obtained from the main fuel passage 118, the needle valve 126 providing a metering means for determining the maximum fuel flow or delivery to the main orifice 120 and the idling and low speed orifices 138 and 140. Through the provision of the constant fuel supply region or reservoir 104 defined by the abutment or ridge 102, a constant head of fuel of a depth up to the upper edge 103 of the abutment is at all times available for delivery through the main and secondary systems into the mixing passage.

It will be seen that the passage 118, the main orifice 120, and the secondary orifices 138 and 140 are all at a lower level than the level of the fuel maintained in the supply region 104. As the pumping means 56 is of a capacity to continuously circulate liquid fuel through the chamber 104 in excess of the maximum fuel requirements for the engine, liquid fuel is maintained at all times in the passages or ducts 94, 96, 98 and the constant supply region or reservoir 104 to the level of the edge 103 of the abutment 102. The excess fuel flows over the ridge or abutment 102 and is returned by gravity through the tubes or passages 106, 108, 114 and 112 into the fuel tank 22.

By reason of the vent means 105 in the plug 101 shown in FIGURE 7, atmospheric pressure exists in the chamber 100 and the fuel tank 22, and a vent opening in the filler cap 24 is unnecessary. This arrangement is effective to prevent foreign matter and dirt entering the fuel tank.

The operation of the carburetor illustrated in FIGURES 1 through 9 is as follows: The operator, in starting the engine, closes the choke valve 33 by rotating the shaft 32 and the engine cranked in the conventional manner. The varying fluid pressures or pulsations set up in the crankcase of the two cycle engine are transmitted through the pulse channels 59 and 60 to the pumping chamber 58, flexing or vibrating the diaphragm 56 to effect a continuous pumping action in the fuel chamber 70 elevating fuel from the fuel tank through the tubes 80, 83, 76 and the port 72 into the fuel chamber 70 from which the fuel is pumped through the port 90, past the flap valve 88, passage 94, restriction 98 and passage 96 into the region or reservoir 104.

The continuous circulation of fuel by the pump maintains a head or column of fuel in the passage 96 and chamber region 104. Fuel in the reservoir 104 is delivered into the mixing passage through the main orifice 120, assuming that the throttle 37 is in open or near open position. Continued engine operation effects continuous flexing of the pumping diaphragm 56 and hence continuous circulation and delivery of liquid fuel from the tank 22 through the passage or duct system hereinbefore described into the constant fuel supply chamber or region 104 for delivery into the mixing passage. Fuel flow to both the main and secondary orifices is metered, regulated or controlled by the adjustable metering needle 126.

When the throttle 37 is in idling or near closed position, fuel from the chamber 104 flows through the secondary system and through the idling orifice 138 to supply an idling fuel and air mixture for the engine. When the throttle 37 is partially opened the fuel may be delivered through the idling orifice 138 and the low speed orifice 140 and some fuel may be delivered through the main orifice 120. However if the throttle is opened through greater distances, the major delivery of fuel occurs through the main orifice 120 and at full open throttle there will be little fuel delivered through the secondary orifices 138 and 140. When the engine is stopped, pumping and circulation of liquid fuel ceases.

It should be noted that in the operation of the carburetor above described, the elevation or lifting of fuel to the region of the discharge orifices is not dependent upon reduced pressure or aspiration in the mixing passage because the head or column of fuel provided by the reservoir 104 is at all times available for delivery into the mixing passage through both main and secondary orifices during engine operation. The excess fuel delivered or circulated by the pumping diaphragm 56 into the chamber or supply region 104 flows over the edge 103 of the abutment 102 and returns by gravity through the tubular means 106, 108, 112 and 114 into the fuel tank.

The vent 105 is perferably placed above the fuel return passage 106 to avoid loss of fuel through the vent 105 by vibration of the engine which may be transmitted to the carburetor and cause some turbulence in the fuel chamber 104.

Turbulence that may be set up in the chamber 104 by vibration does not affect delivery of fuel into the mixing passage because the pump supplies an excess of fuel into the chamber 104 at all times.

Through the arrangement of the invention, there is always assured an ample supply of fuel under a comparatively small fuel head for delivery into the mixing passage, the metering needle 126 providing the means for metering or determining the maximum rate of fuel delivery into the mixing passage. When the engine is stopped or ceases operation, the small amount of fuel in the constant fuel supply region 104 and that in the passage 96 above the passage 118 may flow into the mixing passage, but this small amount of fuel does not impair subsequent starting or operation of the engine.

When the engine is not in operation, fuel is normally maintained in the passage 94, restriction 98 and in the lower region of passage 96 up to the horizontal passage 118 as the flap valves 74 and 88 in the pump construction are in closed position and prevent reverse flow of liquid fuel into the fuel tank through the inlet tube 76. Hence upon subsequent starting of the engine, fuel is available at the passage 118 for delivery into the mixing passage.

FIGURE 10 is a fragmentary detail view similar to FIGURE 9 illustrating a modification of the positioning of a pulse channel for the pumping diaphragm when the carburetor is utilized with the intake manifold of a four cycle type engine.

When the arrangement is used with a four cycle engine, the variations in pressure in the manifold and mixture outlet passage of the carburetor, the pulse channel is in communication with the mixing passage 20.

As shown in FIGURE 10, the end of the pulse channel 60′ is closed by a plug 150 at its entrance in the mounting flange and a passage or channel 152 establishes communication between the pulse duct 60′ and the mixing passage 20. Thus the pumping chamber 58′ is under the influence of varying pressures in the mixing passage 20 through the interconnecting ducts or passages 59′, 60′, and 152.

FIGURES 13 through 17 illustrate a modification of the carburetor or charge forming apparatus illustrated in FIGURES 1 through 9. The carburetor shown in FIGURES 13 and 14 is similar to that shown in FIGURES 1 and 2 and includes a body member 12a provided with a mixing passage 14a having a Venturi 18a in communication with an air inlet 16a and a mixture outlet 20a. A choke valve 33a mounted on a shaft 32a is provided in the air inlet 16a and a throttle valve 37a mounted on a shaft 36a is provided in the mixture outlet region 20a.

The fuel pump construction or fuel circulating means is the same as that shown in the form illustrated in FIGURES 1 through 9. The pump plate or component 64a is secured to the boss portion 54a of the carburetor body 12a, the pump construction including an inlet pipe 76a in communication with a fuel tank.

In this modification of the invention, an adjustable metering means is provided in the secondary orifice system for the engine idling orifice and the fuel supply for the secondary orifices is independnent of the adjustable metering means for the main or high speed fuel delivery orifice.

The arrangement providing a substantially constant fuel head or fuel supply for the main and secondary orifice systems is illustrated in detail in FIGURES 15, 16 and 17. The fuel outlet 94a of the fuel chamber 70a is in communication with a vertically arranged passage or duct 160 which conveys fuel from the pump into a region 162 of a chamber 163. The region 162 is at one side of a raised ridge or abutment 164 which extends partially across the chamber 163, as shown in FIGURE 17, the ridge extending upwardly above the floor of the chamber.

The region 165 of chamber 163 at the opposite side of the ridge or abutment 164 is in communication with a fuel return duct 166 which is in communication with the fuel return tube 108a for conveying excess fuel into the fuel tank. The end of the ridge terminates adjacent a downwardly extending duct or passage 168, the latter being in communication with a horizontally disposed bore 170, the bore 170 being in communication with a main or high speed fuel delivery orifice or passage 172 opening into the restricted region of the Venturi 18a.

A portion of the bore 170 is threaded to accommodate the threaded portion 174 of a manually adjustable valve member 176, the valve body or member 176 being provided with a needle valve portion 178 which extends into the passage 172.

The valve body 176 is provided with a head portion 180 to facilitate adjustment of the needle valve 178, an expansive coil spring 181 being interposed between the head 180 of the valve body and an annular sealing gasket 182 surrounding the valve body 176 to provide friction for maintaining the valve member in adjusted position.

It should be noted that the floor 167 of the constant supply reservoir or chamber 163 in all regions is in a single plane. Thus, fuel flowing upwardly through the supply channel 160 enters the region 162 of the chamber and flows around the end of the ridge or abutment 164. If the engine is in operation and fuel is being delivered into the mixing passage, the fuel flows downwardly into the duct 168 to supply fuel to the mixing passage. Any excess fuel flows along the floor 167 to the fuel return duct 166 and is conveyed to the fuel tank.

The capacity of the pump, being of a character to supply fuel in excess of the maximum requirements of the engine, provides fuel at all times during engine operation in the region of the passage 168 so that there is ample fuel to satisfy the engine requirements. The chamber 163 is closed by a Welsh plug 184 which is provided with a vent 185 preferably located over the return duct 166 to establish atmospheric pressure in the chamber 163 and in the fuel tank.

The secondary fuel delivery system in this form of the invention includes an engine idling orifice 190 and a low speed orifice 191. The carburetor body 12a is fashioned with a boss 192 which is provided with a bore 194 having a threaded portion to accommodate the threaded portion 196 of a valve body 197. The valve body 197 is fashioned with a needle valve portion 198 which cooperates with a passage 199, the outlet of which is the idle orifice 190 opening into the mixing passage. The valve body 197 is provided with a head 200 for manipulation of the needle valve 198.

A spring 202 is interposed between the head 200 and an annular sealing gasket 203, the spring supplying friction to hold the valve member in adjusted position and to maintain the gasket in sealing engagement with the valve body 197 to prevent leakage of fuel. Extending horizontally in the carburetor body 12a is a duct or passage 206, one end being in communication with the bore 194 and with a passage 193 supplying fuel to the low speed orifice 191, shown in FIGURE 14. The opposite end of the duct 206 is connected with the vertically arranged duct or well 168 through a restricted passage 208 shown in FIGURE 16.

Fuel is delivered to the secondary orifice system through the duct or well 168, restriction 208, the horizontal duct 206 and the bore 194 to the idle orifice passage 199 for delivery through the idle orifice 190. The fuel for the idle orifice is metered, controlled or regulated by adjustment of the needle valve 198 by rotating the valve body 197.

In this manner means is provided for metering the fuel delivered through the engine idling orifice 190. Fuel is supplied from duct 206 directly to the passage 193 for the low speed outlet or orifice 191 shown in FIGURE 14.

It will thus be apparent that the fuel delivered to the secondary orifices 190 and 191 is independent of the valve means 178 which meters only the fuel delivered to the main orifice 172. In both the main and secondary orifice systems, the fuel delivery orifices are below the level of the fuel in the chamber 163 so that there is always ample fuel to satisfy the requirements of the engine at all engine speeds. Through the arrangement above described, an adjustable engine idling control is provided. The restriction 208 meters or controls the maximum flow rate of fuel from the duct 168 to the secondary orifice system.

FIGURE 18 illustrates an optional position for the bore and the main orifice as the position of the same may be varied depending upon the calibration requirements of the engine. With particular reference to FIGURE 18, the fuel from the pump flows upwardly through the duct 160 into the region 162 thence around the abutment or ridge 164, and excess fuel returned to the fuel tank through the return duct 166.

The bore may be arranged at the central horizontal plane of the mixing passage in the position shown at 170′ in FIGURE 18 and the main orifice 172′ will be on the horizontal plane of the axis of the mixing passage. In this position a greater head of fuel is provided in the well or duct 168 for the bore 170′ because the distance between the floor 167 is increased and therefore an increased head of fuel is provided. If a greater head of fuel is desired, the bore may be positioned below the position 170′.

In a lower position, the fuel head or column is increased and provides for increased richness in mixture at low speeds under load if such is desired depending upon the engine with which the carburetor is used. Thus it will be apparent that the provision for the adjustment needle in the horizontal bore for adjusting the fuel delivery from the main orifice may be located at a high, intermediate or low level.

This arrangement provides a convenient means for calibrating the carburetor for different engines or operating conditions and improved control over the fuel metering curve. If a moderate enrichment of the mixture at lower speeds under load is desired the intermediate position 170′ would be employed. The cover 184′ for the fuel reservoir chamber 162 may be provided with a vent 185′ to establish atmospheric pressure in the chamber.

In all forms of supply chamber herein shown and described, a vent may be employed in order to avoid any syphoning effect which might otherwise be set up by return flow of liquid fuel through the return system.

FIGURE 19 is a modification of the arrangement of FIGURE 18. In this modification the fuel supply duct or passage 160a is provided with a fitting or bushing 210 formed with a restricted passage 212 for metering fuel flow from the pump into the chamber 163a. Through this means the amount of fuel entering the chamber 163a for satisfying the requirements of the main and secondary orifice systems of the carburetor may be regulated, metered or controlled.

In this form of construction, the fuel return passage 166a to the fuel tank may be provided with a fitting or bushing 214 having a restricted passage 216 for regulating return flow of fuel from the supply chamber 163a to the fuel tank. The horizontal bore accommodating the adjusting needle for the main orifice may be at the position indicated at 170a′ or above or below this position depending upon the calibration desired for a particular carburetor.

FIGURES 20 through 26 illustrate a modified form of carburetor embodying the principles of the invention. This form of carburetor is inclusive of a carburetor body or body member 12b having a mixing passage 14b provided with an air inlet region 16b, a Venturi 18b and a mixture outlet 20b.

A shaft 32b extending across the air inlet is equipped with a choke valve 33b, and a shaft 36b extending across the mixture outlet 20b is equipped with a throttle valve 37b. The carburetor body 12b is provided with a mounting flange 26b adapted to be secured to the crankcase of a two cycle engine or inlet manifold of a four cycle engine.

The throttle operating shaft 36b is provided with a manipulating arm 38b and the choke valve shaft 32b provided with a manipulating arm 34b. The air inlet end of the carburetor is fashioned with a flange 48b to which an air cleaner or air filter is secured. The fuel pumping means embodied in the carburetor in this form of the invention is substantially the same as that hereinbefore described in connection with the other forms of the invention.

The carburetor is provided with a boss portion 54b, a pumping diaphragm 56b and a gasket 62b being disposed between the boss 54b and the component or plate 64b of the pump construction. These components are held in fixed relation to the carburetor body by screws 66b. The pumping diaphragm 56b is provided with an inlet flap valve 74b and with an outlet flap valve 88b. The boss portion 54b is fashioned with a pumping chamber 58b and the member 64b is fashioned with a fuel chamber 70b, the diaphragm 56b forming a flexible wall of each of the chambers 58b and 70b.

The pumping chamber 58b, which is adapted to be pulse operated by varying fluid pressure in the crankcase of the engine or other source of varying fluid pressure, is in communication with an opening in the crankcase wall through interconnecting ducts 59b and 60b shown in FIGURE 24, the duct 60b opening through the mounting flange 26b. An inlet port 72b, adjacent the inlet flap valve 74b formed on the diaphragm, is in communication with a fuel inlet tube 76b connected with a tube 80b extending into the fuel tank 22b by a flexible tube 83b, as shown in FIGURE 23.

The entrance 81b of the tube 80b is disposed near the bottom of the fuel tank 22b. The region above the flap valve 74b is in communication with the fuel chamber 70b by interconnecting ducts 84b and 85b. As shown in FIGURE 26, the fuel chamber 70b is connected with a port 90b adjacent the flap valve 88b by a connecting duct 91b. The opening of the flap valve 88b permits fuel flow from the port 90b into a duct 220 shown in FIGURES 23 and 26.

Extending upwardly into the duct or chamber 220 is a tube 222 which projects through the plate 64b and is connected by means of a flexible tube 114b with a tube 112b extending into the upper region of the fuel tank 22b, the tubes 222, 114b and 112b providing a passage means for return flow of excess fuel delivered into the chamber 220 by the pumping diaphragm. The chamber 220 is adapted to provide a constant reservoir or supply of fuel for both the main and secondary orifice systems.

The main fuel delivery orifice arrangement and adjustable metering means for controlling fuel flow to the main orifice are illustrated in FIGURE 26. The carburetor body 12b is provided with a vertically disposed bore 226 having a threaded portion to accommodate a threaded portion 227 of a valve body or member 228. The valve member 228 is provided with a reduced tenon portion 229 fashioned at its end region with a needle valve 230 which extends into and cooperates with a restricted passage 232 in communication with the chamber 220.

The valve body 228 is provided with a head 234 for adjusting the needle valve 230, a spring 236 being disposed between the head 234 and an annular sealing gasket 238 as shown in FIGURE 26, the spring serving to hold the gasket 238 in sealing relation with the valve body 228 and providing friction to retain the valve member in adjusted position. A fuel conveying passage 240 is in communication with the bore 226 and opens into the restricted region of the Venturi in the mixing passage 14b providing a main orifice or outlet 242.

A bore 243 having its axis aligned with the passage 240, is closed by a cap 244, the bore 243 enabling the drilling of the angularly arranged main fuel passage 240 providing the main orifice 242. With reference to FIGURE 23, the rim or upper edge 223 of the fuel return tube 222 is positioned above the region of the restriction 232 shown in FIGURE 26 so that the fuel level in the chamber 220 is always of a depth up to the rim 223 of the tube 222 and hence the restriction 232 at the needle valve 230 and the lower portion of the bore 226 are submerged in liquid fuel as they are below the level of fuel provided by the rim 223 of the tube 222.

Thus there is always fuel in the lower portion of the bore 226 for delivery through the orifice 242. Fuel is delivered by suction or engine aspiration in the mixing passage through the main orifice 242 from the chamber 220, the fuel flowing through the restricted passage 232 past the needle valve 229, and through the ducts 230 and 240 to the main orifice. The level of the fuel in the chamber 220 may be established by one or more openings drilled in the wall of the tube 222 at a desired position. The secondary fuel delivery system is illustrated in FIGURES 23 and 25. With particular reference to FIGURE 23, the carburetor body 12b is provided with a horizontal bore 246, the bore having a threaded portion to accommodate the threaded portion 248 of a valve body or member 250.

The member 250 has a tenon portion 252 terminating in a needle valve 254 which extends into and cooperates with a restriction 255 in communication with the chamber 220. The secondary orifice system is inclusive of an auxiliary chamber 258, an idle orifice 260 and a low speed orifice 262 in communication with the chamber 258, the orifices opening into the outlet region 20b of the mixing passage. The supplementary or auxiliary chamber 258 is in communication with the bore 246 by means of a passage 264 shown in FIGURE 23.

The valve member 250 is provided with a head portion 266, an expansive coil spring 268 being disposed between the head 266 and an annular sealing gasket 270 serving to set up friction to hold the valve body 250 in adjusted position and the gasket 270 in sealing relation with the valve member.

The secondary system receives fuel direct from the chamber 220, independently of the fuel delivered to the main orifice. When the throttle valve 37b is in near closed position, suction or engine aspiration is effective to cause fuel flow from the chamber 220, through the restriction 255, past the metering needle valve 254 through the bore 246, passage 264 and the auxiliary chamber 258 for delivery into the mixing passage, either through the engine idling orifice 260, the low speed orifice 262 or both, depending upon the position of the throttle valve 37b.

It will be noted from FIGURE 23 that the level or head of fuel in the chamber 220, determined by the upper rim 223 of the tube 222, provides at all times fuel in the restriction 255, the bore 246 and a portion of the passage 264 so that there is always fuel available for delivery from the passage 264 into the supplemental chamber 258 for the secondary orifices when the engine is operating. The fuel pumping means is of a capacity to deliver more fuel into the chamber 220 than is required for the maximum operation of the engine at any speed.

The excess fuel pumped into the chamber 220 flows over the rim 223 of the tube 222 and is returned into the fuel tank 22b. The chamber 220, at its upper wall, may be provided with a small vent opening 274 for establishing atmospheric pressure in the upper region of chamber 220, the vent preventing any syphoning of fuel from the chamber 220.

From the foregoing and with reference to FIGURE 26 it will be seen that the fuel delivered through the main orifice 242 is metered by the adjustable metering needle 230.

With reference to FIGURE 23, it will be seen that the fuel for the secondary orifice system is taken from the chamber 220 independently of the fuel for the main orifice and is metered by the metering needle valve 254.

FIGURE 27 illustrates a modified arrangement of main fuel delivery means and constant fuel supply region. The carburetor body 12c is fashioned with a mixing passage 14c. A pumping means, of the same construction as hereinbefore described, is attached to the body 12c. The fuel delivery duct 280 from the pump is vertically arranged and is in communication with a region 282 into which excess fuel is delivered for return to the fuel tank through a duct 106c and return system of the character hereinbefore described. Extending into the upper end of the fuel channel 280 is a tube 284, the upper rim or edge 285 of which determines the head of fuel effective on the main orifice.

Extending transversely of the vertical channel 280 is a horizontal bore 288 having a threaded portion to receive the threaded portion 290 of a valve member 292 fashioned with a needle valve portion 294. The needle valve 294 extends into a passage 296 the outlet 298 of which provides the main fuel delivery orifice into the mixing passage. The upper end of the supplemental chamber 282 is covered by a Welsh plug 300 provided with a vent 302 to establish atmospheric pressure in the chamber 282 as well as to prevent syphoning action of fuel through the return system into the fuel tank.

In the arrangement shown in FIGURE 27, the stand pipe or tube 284 may be varied in height in order to meter or predetermine the head or height of fuel in the tube 284 effective to cause fuel delivery through the main orifice 298, or openings may be drilled in the wall of the tube to predetermine the height of the fuel head. It will be noted that the orifice 298 is below the fuel level so that there is always ample fuel for delivery into the mixing passage.

FIGURE 28 is a transverse sectional view illustrating a modification of the arrangement providing a constant head of fuel for a main orifice. In this form the carburetor body 12d is fashioned with a mixing passage 14d, a pump plate 64d, a pumping diaphragm 56d, a pulsing or pumping chamber 58d and a fuel chamber 70d. The pump construction is of the same character hereinbefore described in connection with other forms of the invention. The outlet port of the pumping means is a vertical channel 304 which is in communication with a horizontal passage 306 one end of which is closed by a plug 307.

The horizontal passage 306 is arranged above the mixing passage 14d and its axis is preferably parallel to the pumping diaphragm 56d. The horizontal passage or duct 306 is in communication with a vertical bore or duct 308, the upper end of the duct 308 being equipped with a plug 310 provided with a vent opening 311. The duct 308 extends downwardly in the carburetor body on the side of the mixing passage opposite the vertical fuel feed channel 304.

The duct 308 is in communication with a tube 312 which is connected by the flexible tube 114d with the fuel tank in the manner shown in FIGURE 23 to return excess fuel pumped into the channel 306 into the fuel tank. The body 12d is provided with a horizontal bore 315 in communication with the vertical fuel feed channel 304 from the pump. The bore 315 is provided with a threaded portion accommodating the threaded portion 316 of a manually adjustable valve member 318, the valve member having a needle valve portion 320 extending into a passage 322, the outlet 324 of passage 322 being the main fuel delivery orifice.

The valve member 318 has a head portion 326 for manipulating the valve member. A coil spring 328 is disposed between the head 326 and an annular sealing gasket 330 as in the forms of the invention hereinbefore described. The secondary orifice system, which may be of the character shown in FIGURES 6 and 8, receives its fuel through a horizontally arranged duct or bore 142d for conveying fuel to engine idling and low speed orifices of the character shown at 138 and 140 in FIGURE 6.

In the arrangement illustrated in FIGURE 28, the lower surface of passage 306 or the region closest the mixing passage determines the head or height of fuel in the vertically arranged fuel channel or well 304 so that there is a head of fuel in the channel 304 available at all times for delivery through the main orifice 324 and through the secondary orifice system.

Excess fuel pumped into the passage 306 flows through the duct 308, tube 312 and flexible tube 114d into the fuel tank. In this form of construction, the vertical distance of the horizontal passage 306 above the main orifice 324 determines the fuel head on the orifice.

The metering needle 320 is adjustable to meter, regulate or control the flow of liquid fuel to both the main orifice 324 and the secondary orifice system which receives its fuel through the duct 142d in communication with passage 322 at a region between the metering needle 320 and the main orifice 324. The vent opening 311 in the closure member 310 establishes atmospheric pressure in the bore 306 and prevents syphoning action of fuel into the fuel tank.

FIGURE 29 is a modification of the arrangement shown in FIGURE 28. In this form the vertically arranged duct 304e from the outlet of the pump is in communication at its upper end with a horizontal passage 306e. The excess fuel return system includes the vertical bore 308e tube 312e and flexible tube 314e for returning fuel into the fuel tank.

An upwardly extending bore portion 334 on the carburetor body is provided with a vertical bore 336 which is in communication with the horizontal passage 306e. A passage 338 is in communication with the bores 306e and 336 and forms a main fuel conveying passage, the outlet 340 opening into the mixing passage 14e and providing the main fuel delivery orifice.

The bore 336 is threaded to receive a threaded portion 342 of a valve body 344, the valve body being fashioned with a needle valve portion 346 which extends into and cooperates with the passage 338 for metering or controlling the delivery of fuel through the main orifice 340.

The valve member 344 is provided with a head portion 350 and a spring 352 is employed to frictionally maintain the valve member 344 in adjusted position and to exert bias on a sealing gasket 354. Manual adjustment of the valve body 344 and the needle valve portion 346 with respect to the passage 338 meters the delivery of fuel to the main orifice. The lower end region of bore 336 provides a shallow well 337 in communication with the horizontal passage 306e into which fuel flows from the duct 306e to maintain fuel at the main orifice passage 338.

In this form of the invention, the pump hereinbefore described maintains continuous flow of liquid fuel upwardly through the channel 304e and through the horizontal passage 306e so that there is always fuel available at the shallow well 337 for delivery through the main orifice 340. The excess fuel in passage 306e is returned to the fuel tank through the fuel return system. The closure 310e for the upper end of the passage 308e is provided with a vent 311e to prevent syphoning of fuel.

From the foregoing description, it should be noted that during engine operation, an ample supply of fuel is provided by the diaphragm pump circulated in a region or path to assure delivery of liquid fuel into the mixing passage in combination with means for returning excess fuel to the fuel tank. The carburetor may be provided with a single orifice delivering fuel into the mixing passage or the carburetor may be provided with main and secondary orifice systems for supplying fuel to the mixing passage. Where a secondary orifice system is employed the fuel for the secondary system may be supplied and metered independently of the fuel supplied to the main orifice or a single metering means may be used for metering or regulating the fuel flow to both main and secondary orifice systems. In the forms of the invention fuel is continuously circulated through a supply region for the fuel delivery orifices independent of the amount of suction or aspiration in the mixing passage thereby promoting more efficient delivery of fuel to the orifices at all engine speeds and securing improved engine acceleration.

It is apparent that, within the scope of the invention, modifications and different arrangements may be made other than as herein disclosed, and the present disclosure is illustrative merely, the invention comprehending all variations thereof.

I claim:
1. A charge forming apparatus for delivering a fuel and air mixture to an internal combustion engine including
 (a) a fuel tank
 (b) a fuel mixing passage
 (c) primary and secondary orifices in said mixing passage
 (d) a passageway including a primary fuel delivery port and a secondary fuel delivery port
 (e) duct means for connecting said primary orifice with said primary fuel delivery port and said secondary orifice with said secondary fuel delivery port
 (f) a fuel feed line connected to said fuel tank
 (g) a fuel return line connected to said fuel tank
 (h) a chamber spaced above said passageway and said secondary fuel delivery port and including venting means
 (i) said passageway connected to said fuel chamber
 (j) a fuel pump for pumping fuel from said tank to said fuel feed line, and thence to said chamber, said passageway and said primary and secondary ports for delivery to said mixing passage orifices
 (k) an abutment extending from the wall of said fuel chamber partially across and having an end spaced from the wall of said chamber
 (l) said fuel feed and fuel return lines having ports opening into said fuel chamber and spaced from each other on opposite sides of said abutment

(m) said passageway having a port in said fuel chamber positioned approximately between the end of said abutment and the wall of said chamber and between the fuel feed and fuel return line ports (n) whereby excess fuel pumped into said chamber passes over said passageway port and around said abutment and into said fuel return line port for redelivery to said fuel tank.

2. A charge forming apparatus as in claim 1 and wherein (a) said fuel feed and fuel return lines in the area adjacent said fuel chamber are parallel to each other and vertically spaced.

3. A charge forming apparatus as in claim 2 and wherein (a) said primary and said secondary orifices are below said fuel chamber.

4. A charge forming apparatus for delivering a fuel and air mixture to an internal combustion engine including (a) a fuel tank
(b) a fuel mixing passage
(c) primary and secondary orifices in said mixing passage
(d) a passageway including a primary fuel delivery port and a secondary fuel delivery port
(e) duct means for connecting said primary orifice with said primary fuel delivery port and said secondary orifice with said secondary fuel delivery port
(f) a fuel feed line connected to said fuel tank and having one end extending vertically on one side of said mixing passage
(g) a fuel return duct connected to said fuel tank end having one end extending vertically on the other side of said mixing passage
(h) a horizontal fuel feed line above said mixing passage and connecting the one end of said fuel feed line with the one end of said fuel return duct
(i) said horizontal and vertical fuel feed lines and said vertical fuel return duct forming a yoke about said mixing passage
(j) said passageway opening into one of said lines and being below said horizontal fuel feed line
(k) a fuel pump for pumping fuel from said tank to said fuel feed lines, said passageway, and said primary and secondary ports for delivery to said mixing passage orifices
(l) said primary and secondary fuel delivery ports being below said horizontal fuel feed line
(m) vent means for said fuel return duct
(n) whereby excess fuel pumped into said vertical fuel and horizontal fuel lines passes over the opening of said passageway and into said fuel return duct for return to said fuel tank.

5. A charge forming apparatus as in claim 4 and wherein (a) said passageway opens into said vertical fuel feed line.

References Cited by the Examiner

UNITED STATES PATENTS

| 1,323,415 | 12/19 | Sherbondy. | |
|---|---|---|---|
| 2,102,476 | 12/37 | Mennesson. | |
| 2,796,838 | 6/57 | Phillips | 261—35 |
| 2,926,894 | 3/60 | Price | 261—35 |
| 2,994,517 | 8/61 | Fenton | 261—62 |
| 3,031,172 | 4/62 | Rapplean | 261—36 |

FOREIGN PATENTS

| 1,257,050 | 2/61 | France. |
|---|---|---|
| 351,917 | 1931 | Great Britain. |

HARRY B. THORNTON, *Primary Examiner.*

HERBERT L. MARTIN, *Examiner.*